United States Patent
Pastor Nigorra et al.

(10) Patent No.: US 11,444,299 B2
(45) Date of Patent: Sep. 13, 2022

(54) METHOD FOR PREPARATION FOR THE START OF A PARKED FUEL CELL SYSTEM

(71) Applicant: Cellcentric GMBH & CO. KG, Kirchheim Unter Teck (DE)

(72) Inventors: Pere Antoni Pastor Nigorra, Tuebingen (DE); Sven Schmalzriedt, Esslingen (DE); Armin Muetschele, Weilheim (DE)

(73) Assignee: Cellcentric GMBH & CO. KG, Kirchheim Unter Teck (DE)

( * ) Notice: Subject to any disclaimer, the term of this patent is extended or adjusted under 35 U.S.C. 154(b) by 0 days.

(21) Appl. No.: 17/269,757

(22) PCT Filed: Aug. 14, 2019

(86) PCT No.: PCT/EP2019/071789
§ 371 (c)(1),
(2) Date: Feb. 19, 2021

(87) PCT Pub. No.: WO2020/038791
PCT Pub. Date: Feb. 27, 2020

(65) Prior Publication Data
US 2021/0305601 A1      Sep. 30, 2021

(30) Foreign Application Priority Data
Aug. 21, 2018    (DE) .................... 10 2018 006 608.9

(51) Int. Cl.
*H01M 8/04302*    (2016.01)
*H01M 8/04225*    (2016.01)
(Continued)

(52) U.S. Cl.
CPC ... *H01M 8/04302* (2016.02); *H01M 8/04029* (2013.01); *H01M 8/04141* (2013.01);
(Continued)

(58) Field of Classification Search
CPC ......... H01M 8/04007; H01M 8/04029; H01M 8/04037; H01M 8/04052; H01M 8/04111;
(Continued)

(56) References Cited

U.S. PATENT DOCUMENTS 8,057,943 B2    11/2011   Tsuchiya
8,182,952 B2     5/2012   Tanaka et al.
2017/0187053 A1*  6/2017  Hoshi ............... H01M 8/04291

FOREIGN PATENT DOCUMENTS

DE        101 50 386 A1    4/2003
DE    11 2007 000 822 T5    1/2009
(Continued)

OTHER PUBLICATIONS

PCT/EP2019/071789, International Search Report dated Nov. 26, 2019 (Two (2) pages).
(Continued)

*Primary Examiner* — Brittany L Raymond
(74) *Attorney, Agent, or Firm* — Sheridan Ross P.C.

(57) ABSTRACT

A method for the start preparation of a fuel cell system in a vehicle having a fuel cell and a system bypass where an air flow is conveyed by parts of the fuel cell system in order to dry the fuel cell. In a first temporal phase of the method, a larger part of the air flow is led through the fuel cell and a smaller part of the air flow is led through the system bypass, after which, in a second temporal phase, a larger part of the air flow is led through the system bypass and a smaller part of the air flow is led through the fuel cell.

9 Claims, 2 Drawing Sheets

(51) Int. Cl.
  *H01M 8/04029*  (2016.01)
  *H01M 8/04119*  (2016.01)
  *H01M 8/04223*  (2016.01)
  *H01M 8/04746*  (2016.01)

(52) U.S. Cl.
  CPC ... *H01M 8/04225* (2016.02); *H01M 8/04253* (2013.01); *H01M 8/04753* (2013.01); *H01M 2250/20* (2013.01)

(58) Field of Classification Search
  CPC ......... H01M 8/04141; H01M 8/04179; H01M 8/04225; H01M 8/04253; H01M 8/04268; H01M 8/04302; H01M 8/0432; H01M 8/04753; H01M 2008/1095; H01M 2250/20; Y02E 60/50; Y02T 90/40
  See application file for complete search history.

(56) References Cited

FOREIGN PATENT DOCUMENTS

| | | |
|---|---|---|
| DE | 11 2007 002 603 T5 | 12/2009 |
| DE | 10 2009 043 569 A1 | 4/2011 |
| DE | 10 2012 023 799 A1 | 6/2014 |
| DE | 10 2015 005 978 A1 | 12/2015 |
| DE | 10 2015 015 005 A1 | 5/2017 |
| DE | 10 2016 116 214 A1 | 3/2018 |
| EP | 1 978 586 A1 | 10/2008 |

OTHER PUBLICATIONS

German Search Report issued in German application No. 10 2018 006 608.9 dated Feb. 26, 2019, with Statement of Relevancy (Nine (9) pages).

\* cited by examiner

METHOD FOR PREPARATION FOR THE START OF A PARKED FUEL CELL SYSTEM

BACKGROUND AND SUMMARY OF THE INVENTION

The invention relates to a method for preparing a parked fuel cell system in a vehicle for a starting process according to the manner defined in more detail herein.

Fuel cell systems are known from the general prior art. They can be used in vehicles, for example, for providing electrical drive power. One of the problems of fuel cell systems lies in the development of very pure water in the fuel cell system during operation. If it now leads to temperatures below freezing point, which will unavoidably occur when used in vehicles, for example, then the fuel cell system can freeze and then creates corresponding problems when the starting process takes place again or it requires a long time until the fuel cell system can be started. This is because gas line channels and/or valves, for example, are blocked due to moisture that is condensed out and frozen, and other components can be impeded in terms of their function as a result of the ice formation.

In order to counteract this problem, it is known for example from DE 101 50 386 A1 and from the general prior art that a start preparation routine is carried out to prepare a fuel cell system for a start process when parking the fuel cell system, in order to deliver water and moisture out of the fuel cell system. Typically, the fuel cell system is flushed with gas which is conveyed by the air conveying device and/or a hydrogen circulation fan, for example, or a different kind of fan. In doing so, moisture is blown out of the fuel cell system and possible water interceptors and similar can be emptied and flushed through in order to here also remove as much moisture as possible. Now, the fact is that fuel cell systems are typically still very warm when parking and during the subsequent switching off process, such that steam possibly remains in the fuel cell system which later still condenses out, and, if temperatures then fall below freezing point, this can also lead to the problems described above. Thus, it is also known from the further general prior art in addition to or alternatively to the start preparation routine described above to carry out a start preparation routine when the fuel cell system has stopped. To do so, the fuel cell system is roused below a predetermined threshold value, for example when the surroundings temperature decreases, in order to then carry out the start preparation routine and to dry the system. In contrast to drying immediately after parking the fuel cell system, this start preparation routine, often also referred to as conditioning or stop conditioning, has the advantage that water later condensed out can also be removed. In this context, reference can be made to DE 10 2016 116 214 A1, for example.

Typically, according to the general prior art, the start preparation routine will always proceed according to the same pattern by a predetermined amount of gas, for example air and/or hydrogen, being conveyed through the fuel cell system in order to deliver out moisture and to blow out water. In order to achieve this, for example, all gas conveying devices are allowed to run at a constant rotational speed for a fixedly predetermined period of time. The time and the amount of gas connected to it are typically always designed in such a way that a safe and reliable drying can be obtained in every case. On one hand, this is relatively laborious since the time and the amount of gas and thus the energy required and the noise emissions caused must always be designed for the maximum amount of moisture. If the fuel cell system was switched off after an operation with minimal moisture, the drying is carried out much too strongly, which negatively impacts the life expectancy of the fuel cell system or its fuel cells.

Moreover, it is known from DE 11 2007 002 603 T5 that fuel cell systems can be operated in terms of their operating mode in such a way that they have a moister or a drier operation. However, in the drier operation, the life expectancy is typically limited. Nevertheless, the publication proposes, in the case of an imminent parking of the fuel cell system, it should preferably be operated in a dry operation in order to thus be able to extensively dispense with a start preparation routine. In practice, this leads to limitations in terms of the life expectancy, since a sufficient humidification is a decisive criterion for a gentle operation of a fuel cell system or its fuel cells, in particular when used in vehicles and with the high demands for the power dynamics connected with this.

Thus, it would be desirable to be able to always operate a fuel cell system and its fuel cells with the ideal humidification. In order not to have to fear any blockages due to ice or similar in the event of a freezing start, as efficient a start preparation routine as possible in the sense described above is to be accordingly provided in order to dry the fuel cell system as necessary.

The object of the present invention is now to specify such a start preparation routine which enables a very efficient method which is thus economic in terms of emissions and energy for drying a fuel cell system.

In the case of a fuel cell system in a vehicle with a fuel cell and a system bypass, the method according to the invention provides that the fuel cell system, as in the prior art, is dried by a conveyed air flow. In order to carry out the method as efficiently as possible, it is here provided that, in a first temporal phase, a larger part of the air flow is guided through the fuel cell and a smaller part of the air flow through the system bypass. In this phase, the fuel cell is thus primarily dried and only a little air gets through the system bypass. In a temporally successive phase, this is reversed, in which a larger part of the air flow is guided through the system bypass and a smaller part of the air flow through the fuel cell. This supports a very efficient drying of the fuel cell system.

According to a very advantageous development of the idea, heating devices in the fuel cell system are already operated before the first temporal phase in a pre-switched heating phase. The operation of the heating device can be, in particular, the operation of present electrical heating devices via which valves, line elements, water interceptors or similar, for example, can be heated. Any other kind of heating device can also be used, for example a heat exchanger which is operated with residual heat from the coolant or a heat accumulator. For example, an operation of actuators for valve devices or similar in order to heat the valve, or similar, connected to the actuator in such a way that excessive thermal discharge arises, is conceivable here. By means of such a heating, water is evaporated or, in the case of first parts of the water already being frozen, defrosted in order to thus make the drying particularly efficient.

Here, the operating of the heating device can be maintained during the entire start preparation routine, i.e., the two phases switched one after the other temporally with the conveyed air flow. Here, the conveyed air flow is increased to a constant value at the start of the first phase and thus to a constant pressure and is held constant until the end of the second phase, even if the air flow in terms of its volume flow between the system bypass and the fuel cell is firstly divided into the one and then into the other type. This all contributes to an efficient drying of the fuel cell system.

Here, the air flow can be led in particular through the cathode side of the fuel cell, while, for the duration of the first and the second phase, an anode chamber of the fuel cell is provided with hydrogen with pulsating pressure when the anode discharge valve is open. The anode side is thus flushed through with hydrogen, for which an anode discharge valve is correspondingly opened after the anode or in a fundamentally known anode circuit. The pulsating pressure of the hydrogen ensures that moisture and, in particular, liquid water is removed very effectively from the anode chamber of the fuel cell even with a relatively low volume flow of hydrogen, such that an efficient drying is obtained with minimal hydrogen consumption. The hydrogen is then brought into the exhaust air line in the usual way, for example, and can be released into the surroundings in a correspondingly diluted form with the volume flow of the exhaust air flowing through the system bypass and the cathode chamber of the fuel cell, such that no emission threshold values are exceeded, and no combustible or even explosive mixtures can arise.

The pulsating pressure is here set to the value of the constant pressure of the air flow, preferably in such a way that its average is greater than or equal to the value of the constant pressure. Thus, an ideal output of moisture from the entire fuel cell system can be obtained.

According to a very advantageous development of the idea, the start of the whole start preparation routine can be carried out depending on a temperature threshold value. The start preparation routine is thus not started immediately after parking the fuel cell system, but rather as soon as a temperature threshold value has been achieved in the manner described at the start in the context of a stationary conditioning when the fuel cell system is parked. To do so, for example the surroundings temperature or the temperature inside the fuel cell system, in particular in the region of the fuel cell or in the coolant for the fuel cell is measured. If the temperature value falls below a temperature threshold value, for example a temperature threshold value of 5° C., then the first phase can be correspondingly started, or if a pre-switched heating phase is scheduled, it is exactly the case, wherein the start of the first phase is then carried out temporally after the start of the heating phase, for example after a constant or temperature-dependent heating time.

Further advantageous designs of the method according to the invention emerge from the exemplary embodiment which is described in more detail below with reference to the figures.

DETAILED DESCRIPTION OF THE DRAWINGS

Figure 1:
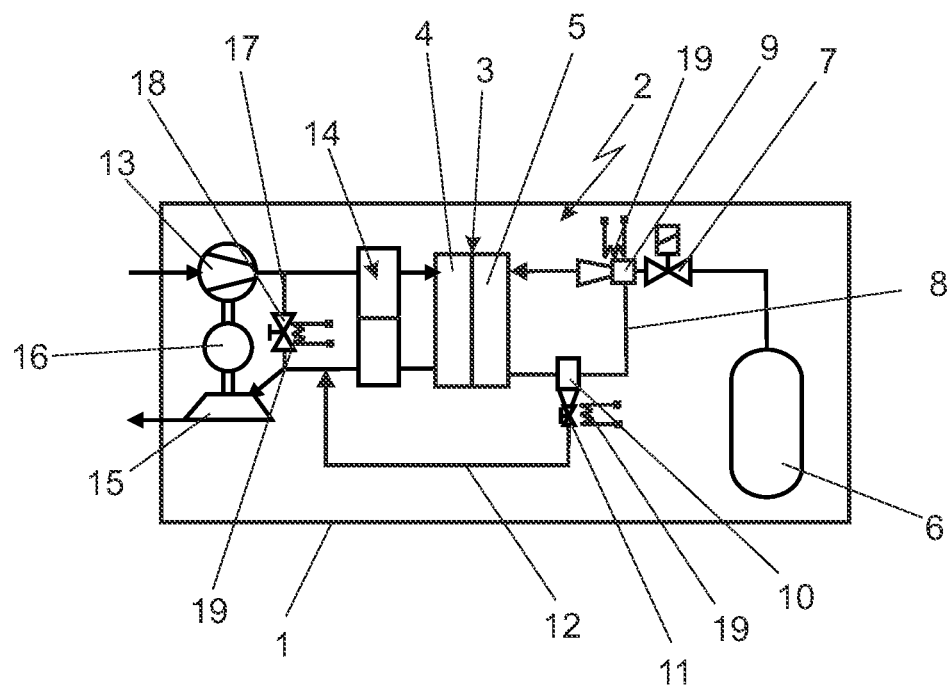
FIG. 1 illustrates a vehicle having a fuel cell system which is suitable for carrying out the method according to the invention.

In the depiction of FIG. 1, a vehicle 1 is indicated in a very schematic manner. The vehicle 1 can be formed, for example, as a passenger vehicle, commercial vehicle, as a rail-mounted vehicle or as a forklift vehicle for logistical purposes. The vehicle 1 could be used just as well as a ship or airplane, for example. A fuel cell system 2 which is indicated in principle and whose core forms a fuel cell 3 is located in the vehicle 1. This fuel cell 3 is to be constructed as a stack of PEM individual cells, as a so-called fuel cell pile or fuel cell stack. A cathode chamber 4 and an anode chamber 5 are symbolically indicated inside the fuel cell 3. For regular operation, air is supplied to the cathode chamber 4 via an air conveying device 13 as an oxygen supplier. Exhaust air emerges from the fuel cell system 2 via an exhaust air line and an exhaust air turbine 15. Hydrogen from a pressurized gas accumulator 6 is supplied to the anode chamber 5 of the fuel cell 3 via a pressure regulating and dosing unit 7. Hydrogen that is not used and inert gas and water, which emerge in the region of the anode chamber 5, are returned via a recirculation line 8 and can be supplied again to the anode chamber 5 mixed with fresh hydrogen. A recirculation conveying device 9 is here arranged in the recirculation line 8, the recirculation conveying device being formed in the exemplary embodiment depicted here as a gas jet pump. The recirculation conveying device 9 could just as well be realized as a hydrogen recirculation blower or HRB or as a combination of a gas jet pump and a blower.

Moreover, a water interceptor 10 is located in the recirculation line 8, the water inceptor being connected to the exhaust gas line via an outlet line 12 with an anode outlet valve 11. Thus, water can be collected via the water interceptor 10 and the valve 11 and released from time to time, for example. It is just as conceivable to release the water depending on a fill level in the water interceptor 10 depending on concentrations in the so-called anode circuit. Moreover, gas can also be released together with the water, since inert gas which is diffused through the membranes of the fuel cell 3 from the cathode chamber 4 into the anode chamber 5 builds up in the anode circuit over time. Since this would reduce the hydrogen concentration in the anode circuit that is constant in terms of its volume, this gas must also be released. This can be carried out via an individual line or together with the water via the outlet line 12 and the valve 11.

Moreover, in the depiction of FIG. 1, an electrical engine 16 can now be seen in effective connection with the air conveying device 13 and the exhaust air turbine 15. These can sit on a common shaft, as indicated by way of example. It would be just as conceivable to provide the air conveying device 13 with an electrical engine and the exhaust air turbine 15 with a generator and to connect these purely electrically. The intention and purpose of such a so-called electrical turbocharger or motorized turbocharger is for energy from the exhaust air to be able to be used in order to supply the air conveying device 13 with supporting power and thus to minimize the necessary electrical power for the air conveying device 13. In certain situations in the event of a lot of exhaust air and low supplied air requirement, for example when parking the fuel cell system 2, it can also result in an excess of energy in the region of the exhaust air turbine. This can then be converted in terms of the generator into electrical power via the electrical engine 16 and stored, for example, in a battery not depicted here in more detail.

Moreover, in the vehicle 1 indicated, the fuel cell system 2 has a humidifier 14, which can be formed, for example, as an inherently known gas/gas humidifier, and which, in the regular operation, converts moisture from the moist exhaust air from the cathode chamber 4 into the dry and hot delivery air to the cathode chamber 4, between the delivery air line and the exhaust air line. Furthermore, a so-called system bypass is arranged between the pressure side of the air conveying device 13 and the suction side of the exhaust air turbine 15, the system bypass consisting of a bypass line 17 and a bypass valve 18. This system bypass allows conveyed air to be discharged again without it flowing through the fuel cell 3 or the cathode chamber 4. With current compressors, this can be useful and necessary in order to ensure, when the air conveying device 13 is in operation, that it does not exceed the pump threshold value. The system bypass can also be opened in other situations in order to lead air past the fuel cell 3, for example with a highly dynamic load jump downwards or similar. The air led via the system bypass then reaches the surroundings via the exhaust air turbine 15, such that at least one part of the energy used for compressing can also be regained again.

In the fuel cell 3 itself and thus in all line elements lying after the fuel cell 3 in the current direction or, in the event of a circuit guide on the anode side, for example, in all other components of this circuit guide of exhaust gas as well, moisture is now collected when the fuel cells are in operation which emerges as product water when converting oxygen and hydrogen to electrical power in the fuel cell 3. The potential danger of the fuel cell 3, the lines, the valves 11, 18 and similar freezing is also accompanied by this moisture, which is pure water, when the temperatures in the surroundings of the vehicle 1 and thus after a longer stationary time as well as in the vehicle 1 and, in particular, in the fuel cell system 2, fall below freezing point. In principle, the fuel cell system 2 or the fuel cells 3 can of course also be thawed with the restart. However, this is relatively time intensive. Nevertheless, for this purpose, heating elements 19 can be provided in the fuel cell system. In the depiction of FIG. 1, these are indicated in each case as electrical heating elements 19 which can also optionally be used for the method described later. They could just as well be heat exchangers which undertake the heating with the residual energy from the fuel cell system, which is stored in coolant, for example.

Nevertheless, with temperatures below freezing point when the fuel cell 3, the lines and components thaw, the start can be very laborious. In order to be able to counteract this, as is known from the general prior art, a start preparation routine is used in order to dry the fuel cell system 2 and its components to such an extent that freezing no longer causes a serious impediment to the start process of the fuel cell.

Figure 2:
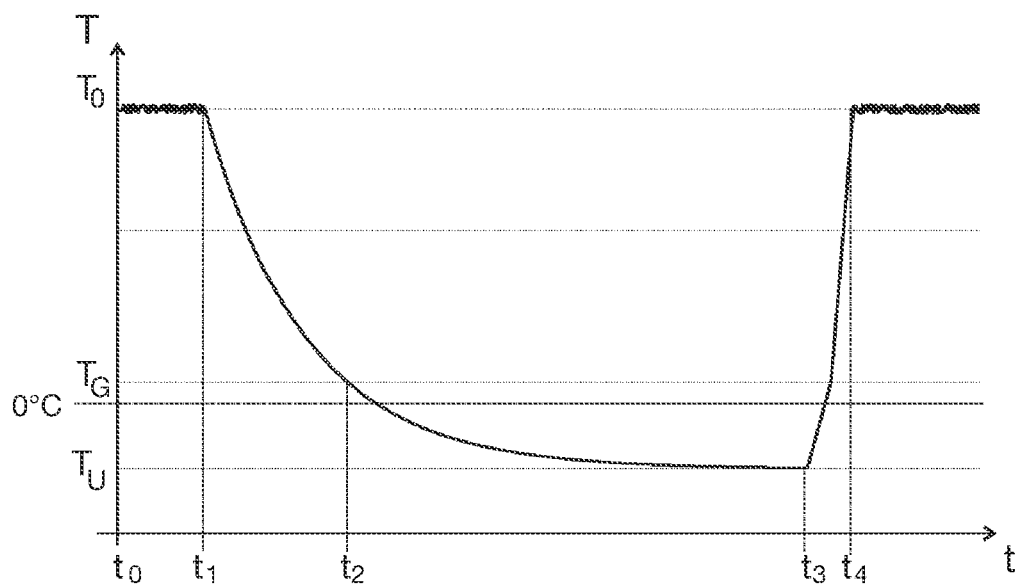
FIG. 2 is a diagram of the temperature T over time T, to illustrate the point in time of the start preparation.

A diagram of the temperature T over time t is shown in the depiction of FIG. 2. At the point in time to, the fuel cell system 2 or the vehicle 1 having the fuel cell system 2 is in regular operation. The average temperature of the fuel cell system 2 here fluctuates by the average temperature usually occurring of the fuel cell system 2 which is referred to here with $T_0$ and, for example with a fuel cell system 2 having a PEM fuel cell 3 can be in the magnitude of 65° C.

At the point in time $t_1$, the fuel cell system 2 is now switched off. The surrounding temperature $T_U$ is here below freezing point, i.e., below the indicated line at 0° C. With time t, the temperature T thus correspondingly cools down and, at the point in time $t_3$, reaches a temperature value, for example, which roughly corresponds to the surrounding temperature $T_U$. In order to now prevent the fuel cell system, 2 and, in particular, the fuel cell 3 freezing in such cases, as is known in principle from the prior art, upon reaching a temperature threshold valve $T_G$, which, for example, is just above freezing point of water, for example 3° C. to 10° C., in particular 5° C., the start preparation routine is started. In the depiction of FIG. 2, this is the case at the point in time $t_2$.

Figure 3:
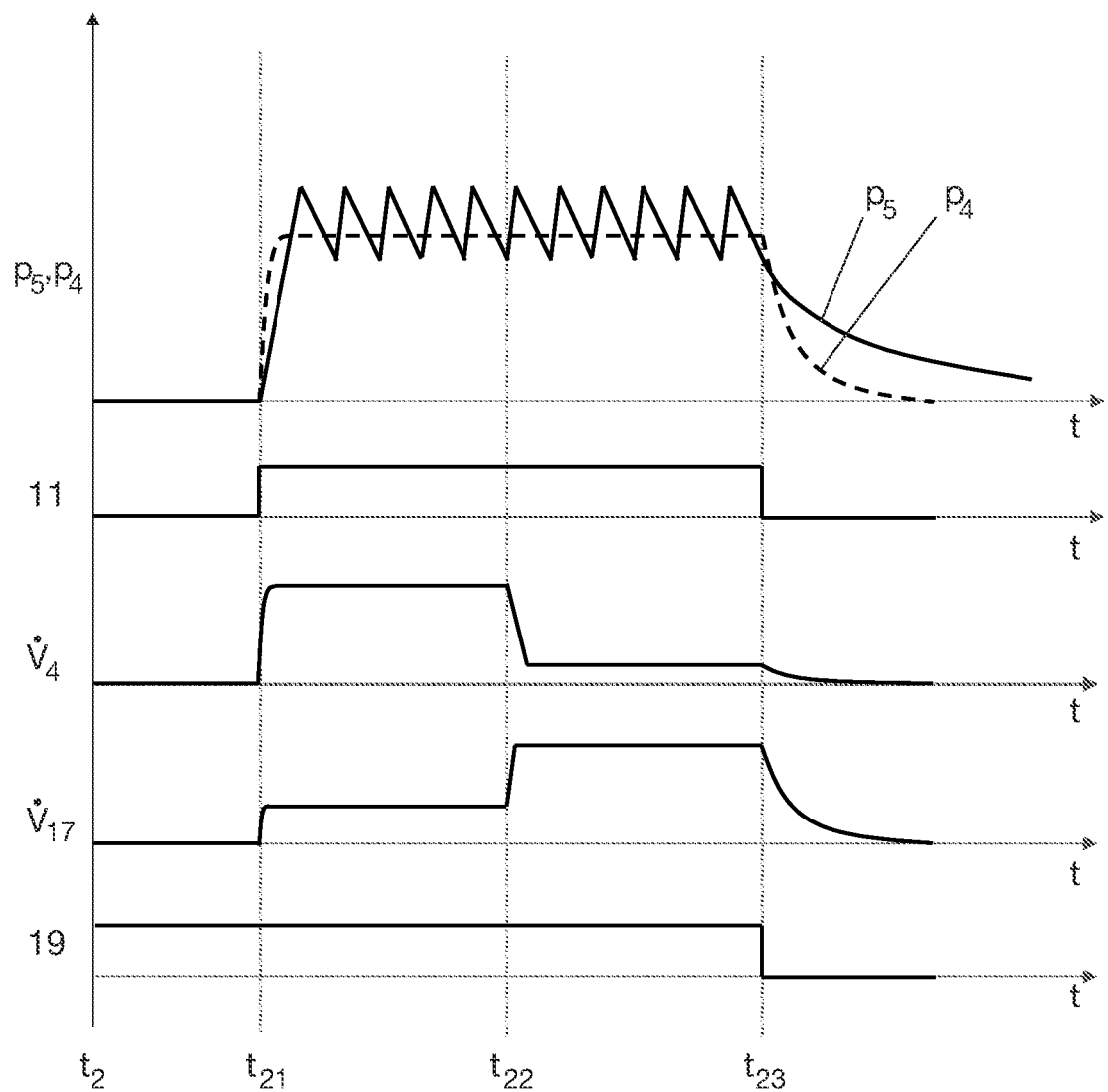
FIG. 3 is a diagram of various states over time t, to explain the course of the method according to the invention.

The concrete course of a preferred design variant according to the method according the invention is now specified in the depiction of FIG. 3. Here, various sizes are depicted over time t, from the start point in time $t_2$, analogous to the depiction in FIG. 2. Right at the top, the pressure $p_4$ on the cathode side of the fuel cell system 2 is depicted, which is constructed by a conveyed air flow $\dot{V}$. It is indicated in the diagram with a dotted line. With the drawn-through line, the corresponding pressure on the anode side is indicated and labelled with $p_5$. The entire start preparation routine is now subdivided into three different phases in the preferred exemplary embodiment depicted here. The first phase between the points in time $t_2$ and $t_{21}$ constitutes a pre-switched heating phase. Then, the first temporal phase between points in time $t_{21}$ and $t_{22}$, then the second temporal phase between the point in time $t_{22}$ and $t_{23}$. After the point in time $t_{23}$, the pressures and the volume flows return to zero more slowly, the automatic operation for the start preparation of the fuel cell system 2 for a restart later is then concluded. The switching behavior of the anode outlet valve 11 is depicted below the two pressures $p_4$, $p_5$, wherein, in the diagram, the line on the time axis t constitutes a closed and, below the time axis t, an open anode outlet valve 11. Two divided partial volume flows X of a conveyed air flow $\dot{V}$ are located in one case below this through the cathode chamber 4, wherein this volume flow is then labelled with $\dot{V}_4$ and, in one case, through the system bypass, i.e., the bypass line 17 and the system bypass valve 18, wherein this air flow is then labelled with $\dot{V}_{17}$. Using similar logic as with the anode outlet valve 11, an indicated operation of the heating elements 19, which are ideally present in the fuel cell system 2, are located below this, wherein here a line above the time axis t also indicates the switched-on operation of the heating and a line on the time axis t the parked operation of the heating elements 19.

At the point in time $t_2$, the start preparation routine begins which is here carried out as a so-called stationary conditioning. The start begins with a pre-switched heating phase between the points in time $t_2$ and $t_{21}$. In this phase, only the heating elements 19 are in operation in order to heat water, in particular, and to ideally evaporate it. Then, a volume flow $\dot{V}$ of air is conveyed via the air conveying device 13 or also an alternative blower or a pressure accumulator. This is divided in the system architecture of the fuel cell system 2 into the two air flows $\dot{V}_4$ indicated in the diagram in FIG. 3 through the cathode chamber 4 and $\dot{V}_{17}$ through the system bypass. The regulation can be achieved, in particular, by opening and closing the bypass valve 18 more or less greatly, for example as a proportional valve, or by a pulse-width-modulated controller if the bypass valve 18 is formed as a pure on/off valve. In the first phase of the through-flow with the air flow $\dot{V}$, i.e., between the points in time $t_{21}$ and $t_{22}$, the larger part $\dot{V}_4$ of the air flow $\dot{V}$ is led through the cathode chamber 4, while only a smaller part $\dot{V}_{17}$ of the air flow $\dot{V}$ flows through the system bypass. The pressure $p_4$, which is constructed by the air flow $\dot{V}$, is here held constant after the increase. In a second phase between the points in time $t_{22}$ and $t_{23}$, the air will then flow in reverse, namely only a smaller part $V_4$ through the cathode chamber 4 and the larger part $V_{17}$ of the air flow $\dot{V}$ through the system bypass. At the end of the start preparation routine at the point in time $t_{23}$, the air conveying device 13 and the hydrogen dosing is then parked, and the pressures p and volume flows $\dot{V}$ are correspondingly relieved.

Here, it is such that the heating elements 19 remain in operation during the whole start preparation routine, i.e., the pre-switched heating phase, just as with the first and the second temporal phase. They are only switched off again at the point in time $t_{23}$, wherein it would optionally be conceivable to switch off the heating elements 19 already during the second phase, i.e., at a point in time between the points in time $t_{22}$ and $t_{23}$. The anode exhaust valve 11 is consistently open during the first and the second temporal phase, i.e., between the points in time $t_{21}$ and $t_{23}$. Hydrogen from the pressurized gas accumulator 6 is dosed in a pulsating manner through the anode chamber 5, as is correspondingly indicated via the pressure $p_5$. By means of this pulsed dosing, liquid water, in particular, but also humidity, is removed much more effectively, such that the anode chamber 5 can be dried much more efficiently with a minimal amount of hydrogen. The individual pressure peaks and pressure reductions of the pulsating pressure $p_5$ here fluctuate by the pressure value $p_4$ in the cathode chamber 4, which is correspondingly held constant. Ideally, the average of the pressure $p_5$ is, for example, above the constant pressure value $p_4$ during the start preparation routine in order to efficiently prevent the penetration of oxygen through the membranes of the fuel cell 3 from the cathode chamber 4 into the anode chamber 5. Via the open anode exhaust valve 11, the water is then removed via the line 12 and then, together with the water and mixed or diluted by the air flow $\dot{V}$, which flows through the cathode chamber 4 and the system bypass, reaches the surroundings. At the point in time $t_{23}$, i.e., after the end of the second temporal phase, the anode exhaust valve 11 is then closed again. Drying the fuel cell system is then ended.

By dividing the volume flow $\dot{V}$ of the air in the manner described, a very efficient drying is achieved. This applies, in particular, when the heating elements 10 are additionally operated in a pre-switched heating phase between the points in time $t_2$ and $t_{21}$. However, in principle, it also functions without this pre-switched heating phase, such that, in the depiction of FIG. 3, the start preparation routine would then start at the point in time $t_{21}$, and the lower part of the diagram 3 with the heating elements 19 could be omitted.

The invention claimed is:

1. A method of a start preparation routine of a fuel cell system in a vehicle, wherein the fuel cell system has a fuel cell and a system bypass, comprising the steps of:

conveying a larger part of an air flow through the fuel cell and a smaller part of the air flow through the system bypass in a first temporal phase; and conveying a larger part of the air flow through the system bypass and a smaller part of the air flow through the fuel cell in a second temporal phase which is after the first temporal phase;

wherein a heating device in the fuel cell system is operated before the first temporal phase in a pre-switched heating phase.

2. The method according to claim 1, wherein the heating device is operated until an end of the second temporal phase.

3. The method according to claim 1, wherein the air flow at a start of the first temporal phase is increased to a constant pressure and is held at the constant pressure until an end of the second temporal phase.

4. The method according to claim 1, wherein a cathode side of the fuel cell system is flowed through with the air flow.

5. The method according to claim 1, wherein during the first temporal phase and the second temporal phase, an anode chamber of the fuel cell is provided with hydrogen at a pulsating pressure when an anode outlet valve is open.

6. The method according to claim 5, wherein the air flow at a start of the first temporal phase is increased to a constant pressure and is held at the constant pressure until an end of the second phase and wherein the pulsating pressure is set to a value of the constant pressure.

7. The method according to claim 6, wherein an average of the pulsating pressure is greater than or equal to the value of the constant pressure.

8. The method according to claim 1, wherein a start of the first temporal phase depends on a temperature threshold value.

9. The method according to claim 1, wherein a start of the heating phase depends on a temperature threshold value and wherein the first temporal phase is started depending on a time after the start of the heating phase.

\* \* \* \* \*